United States Patent [19]

Komori et al.

[11] 4,215,588

[45] Aug. 5, 1980

[54] CONTROL DEVICE FOR AN INTERMITTENTLY MOVABLE DRIVER MEMBER

[75] Inventors: Shigehiro Komori, Yokohama; Hiroyuki Hattori, Tokyo; Tsuneki Inuzuka, Machida; Koichi Miyamoto, Tokyo, all of Japan

[73] Assignee: Canon Kabushiki Kaisha, Tokyo, Japan

[21] Appl. No.: 943,388

[22] Filed: Sep. 18, 1978

Related U.S. Application Data

[63] Continuation of Ser. No. 697,129, Jun. 17, 1976, abandoned.

[30] Foreign Application Priority Data

Jun. 26, 1975 [JP] Japan .................................. 50/79890

[51] Int. Cl.[3] .............................................. F16H 27/02

[52] U.S. Cl. .......................................... 74/113; 74/54; 74/122; 74/125.5; 192/33 R; 192/142 R

[58] Field of Search .................. 74/54, 112, 113, 122, 74/125.5, 569, 813 R, 813 C, 813 L; 192/33 R, 142 R

[56] References Cited

U.S. PATENT DOCUMENTS

| | | | |
|---|---|---|---|
| 672,470 | 4/1901 | Wolbert | 74/54 |
| 2,125,593 | 8/1938 | Starr | 192/33 R |
| 2,338,305 | 1/1944 | Simmon | 74/112 |

*Primary Examiner*—Stephen C. Bentley

*Attorney, Agent, or Firm*—Fitzpatrick, Cella, Harper & Scinto

[57] ABSTRACT

A control device for driver member comprises an intermittently movable driver member, a follower member adapted to follow the driver member for displacement, retention and return displacement, a control member for controlling the starting and stoppage of the movement of the driver member, and a first and a second signal for starting the movement of the driver member. The movement of the driver member may be started by the first signal to displace the follower member to bring about the retaining position, whereafter the movement of the driver member may be automatically stopped by the control member, and the movement of the driver member may be restarted by the second signal and at the position whereat the return displacement of the follower member is completed, the movement of the driver member may be automatically stopped by the control member.

1 Claim, 22 Drawing Figures

CONTROL DEVICE FOR AN INTERMITTENTLY MOVABLE DRIVER MEMBER

This is a continuation of application Ser. No. 697,129 filed June 17, 1976, now abandoned.

BACKGROUND OF THE INVENTION

1. Field of the Invention

This invention relates to a control device for driver member under the control of which the intermittently moving driver member (cam) and its follower member (cam follower) act to effect a predetermined operation.

2. Description of the Prior Art

Generally, mechanical apparatuses often use a cam rotatable on an axis and a cam follower following the movement of the cam when it is desired to repeat such a cycle of operation that a certain member is displaced from a certain first position to a second position at a certain period of time and retained at the second position for a predetermined time, whereafter the member is returned to the first position. Such a system utilizes the ramp surface of the cam to provide the displacement and this leads to an advantage that the displacement between the first and the second position can take place smoothly without any shock involved, as well as an advantage that the drive source may be relatively small even when a great force is required for the displacement.

However, in such conventional use of the cam, the cam is caused to make one complete rotation at a predetermined angular velocity and during that time, all operations—for instance, displacement, retention and displacement (return)—are accomplished. The relation between the angle of rotation $\alpha$ of the cam and the time t and the displacement $\chi$ of the cam follower is illustrated in FIG. 12 of the accompanying drawings. With such conventional use of the cam, the cam is rotated always at a predetermined angular velocity and accordingly, the angle $\alpha$ and the time t are in proportional relationship.

Usually in designing a camming mechanism, the retention time $t_2$ is first determined and then the displacement times $t_1$ and $t_3$ are added before and after the retention time. Then, the time T required for one complete rotation of the cam, namely, the rotational velocity of the cam, is determined so that these three $t_1$, $t_2$ and $t_3$ may be satisfied in one complete rotation. In this case, it will be optimum if T can be set so that $t_1+t_2+t_3=T$. Actually, however, this is not always possible in relation to other parts but there may sometimes occur a relation that $t_1+t_2+t_3<T$ which may result in wasteful rotation of the cam, or in some cases it may be unavoidable to adopt a relation that $t_1+t_2+t_3>T$. In the latter case, the displacement times $t_1$ and $t_2$ must be reduced to secure the absolutely necessary retention time $t_2$ and this will mean the displacements accompanied by shocks and the loss of the advantage of using the cam.

Also, if the retention time $t_2$ is long, the time T required for one complete rotation of the cam must be increased and in this connection, a wide-range speed reduction mechanism must be provided in the drive path from a drive source such as motor or the like to the cam, which leads to complex construction of the machine or necessity for a greater space.

Further, if the absolute values of the displacement times $t_1$ and $t_3$ are equal to keep smoothness of displacements but the retention time is longer and accordingly its ratio to one complete rotation T on the angles $\alpha_1$ and $\alpha_3$ are smaller, the angle of the ramp surface in the cam for displacement will be steeper so that the pressure with which the cam follower is urged against the ramp surface of the cam will be greater. This will promote the abrasion of the cam and cam follower which will also give rise to the problem of poor durability particularly when fine or subtle movements are required. In addition, the cam and cam follower must be structurally sturdy. Further, the torque exerted on the clutch will also be greater and this means that the clutch used must be of a great capacity.

Furthermore, since the mechanism now under discussion is based on the presupposition that the cam is caused to make one complete rotation at a predetermined angular velocity to effect the operation or that T is constant, the retention time $t_2$ is determined as invariable by the retention angle $\alpha_2$ resulting from the cam geometry. Therefore, if it was desired to use the mechanism for the same operation but with the retention time t being variable, the cam usually was unusable. Also, if it was attempted to secure the retention time $t_2$ for the same cam with the angular velocity of the cam being varied by a speed reduction device or the like, the displacement times $t_1$ and $t_2$ would be varied together and this would also be inconvenient.

SUMMARY OF THE INVENTION

It is therefore an object of the present invention to overcome all the above-noted problems peculiar to the prior art and to provide a simple and convenient control device for driver member which is applicable in wider fields.

It is another object of the present invention to enable the retention time to be set up, as desired, depending on how signal is put out, independently of the cam configuration.

It is still another object of the present invention to increase the angular velocity of the cam to thereby increase the angle of displacement when one cycle is accomplished by one complete rotation of the cam.

It is yet another object of the present invention to enable the operation heretofore accomplished by one complete rotation of the cam to be completed by one-half, one-third, one-fourth and so on of one complete rotation of the cam, without the angular velocity thereof being changed.

In view of the fact that, as is apparent from FIG. 12, when the cam is in its retaining position during rotation thereof, the cam configuration only retains the cam follower at that level and the angle $\alpha_2$ is necessary only to provide the retention time $t_2$, the present invention stops the cam immediately after it has entered from its rest position into its retaining position through its displacement zone, and again rotates the cam after a predetermined retention time in response to a signal to directly enter into another displacement (return) zone and come to its rest position.

DESCRIPTION OF THE PREFERRED EMBODIMENTS

Description will first be made of an example of the copying machine in which the cam and cam follower as previously described are used for the feeding section in the conventional manner.

This copying machine is of the type which may be loaded with four cassettes at a time so that copy medium in any selected one of the four cassettes may be fed for convenience of the copying operation and which is of a compact construction.

Figure 1:
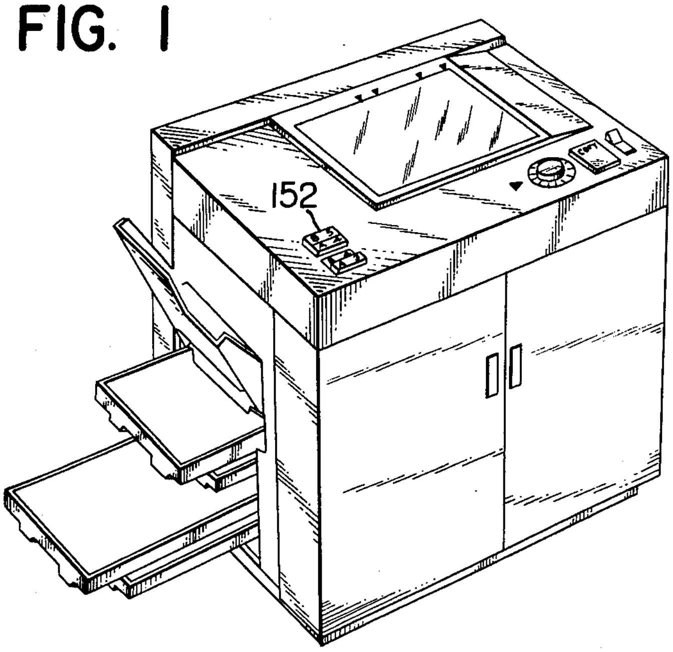
FIG. 1 is a pictorial, perspective view of a copying machine.
Figure 4:
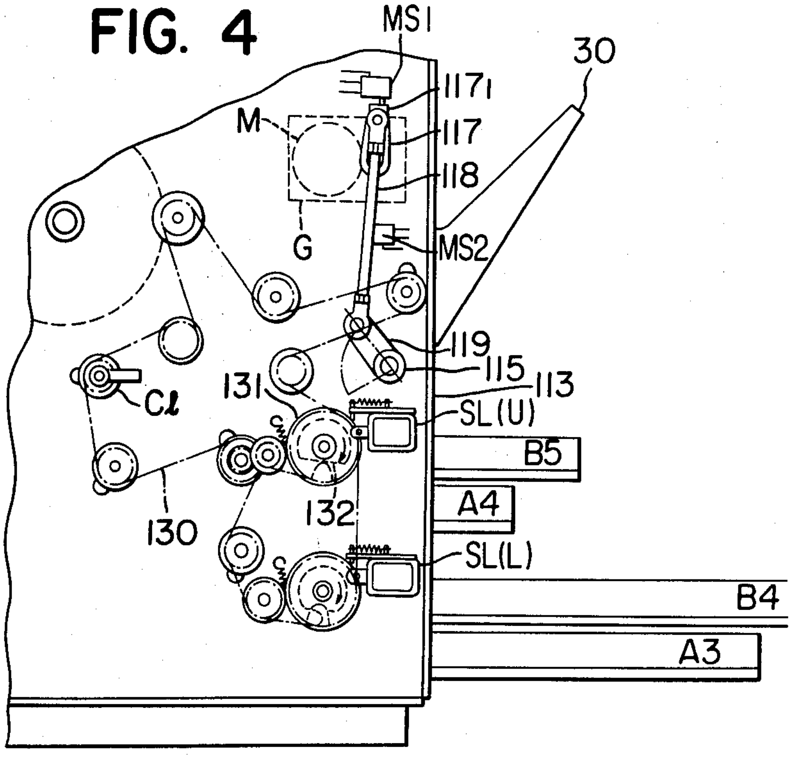
FIG. 4 is a fragmentary rear view showing the driving section of the feed device.
Figure 2:
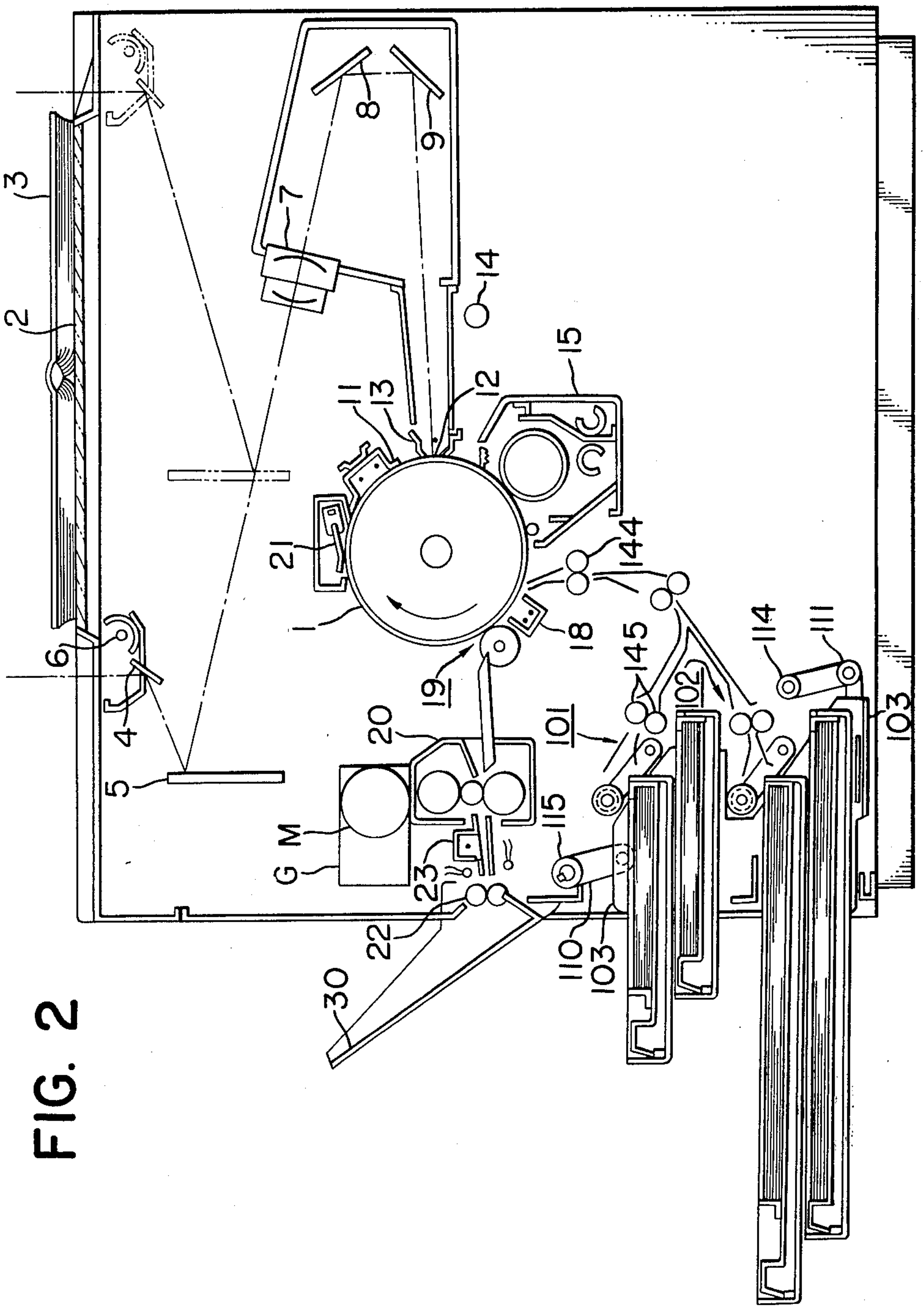
FIG. 2 is a vertical cross-sectional view of the copying machine.
Figure 3:
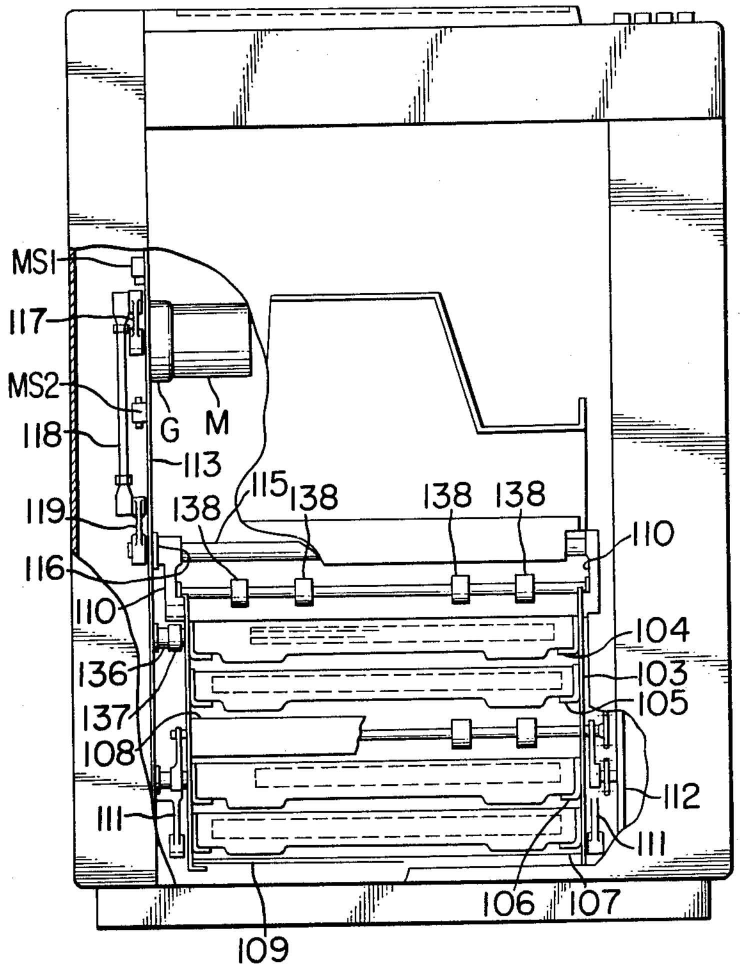
FIG. 3 is a left-hand side view showing the feed device of the copying machine.

FIG. 1 is a pictorial perspective view of such copying machine and FIG. 2 a cross-sectional view thereof.

Operation of the copying machine will be explained by reference to FIG. 2.

An image original 3 is placed on an original carriage glass plate 2 forming an original supporting surface on top of the machine housing, and is slit-exposed by an optical system comprising an illumination lamp 6, a movable mirror 4 movable therewith, a movable mirror 5 movable at half the velocity of and in the same direction as the movable mirror 4, a lens 7 and stationary mirrors 8 and 9, so that the image of the original may be formed on a drum 1. The surface of the drum is a photosensitive surface comprising a photoconductive layer covered with a transparent insulative layer, and is charged to the positive polarity by a positive charger 11 supplied with a positive high tension current. Subsequently, when it reaches an exposure section 12, the photosensitive drum is exposed to the image of the original while, at the same time, it is AC-discharged by an AC discharger 13 supplied with a high AC voltage.

Next, the photosensitive drum is subjected to allover exposure by an allover exposure lamp 14 to form an electrostatic latent image on the drum surface (photosensitive medium), whereafter the drum enters a developing device 15.

The electrostatic latent image is developed into a visible image by the dust development technique of the sleeve type.

By an image transfer charger 18, the image on the drum 1 is then transferred onto a copy medium 17 fed from a feeding section 101 or 102.

After the image transfer, the copy medium is separated from the drum 1 at the separating section 19 and guided to a fixing section 20 for fixation, whereafter any excess charge on the copy medium is removed by a discharger 23 and the copy medium is discharged onto a tray 30 by a set of discharge rollers 22. On the other hand, the drum surface (photosensitive surface) is cleaned for removal of any residual toner thereon by a blade urged thereagainst, thus becoming ready for reuse in another cycle.

The feed device which forms the essential point of the present invention will now be described with reference to FIGS. 3 to 10.

The present copying machine, as seen in FIG. 2, has two independent feeding sections 101 and 102 which are each loaded with two cassettes. In the figure, cassettes of formats B5 and A4 are mounted in the upper feeding section and cassettes of formats B4 and A3 in the lower feeding section. These will hereinafter be called B5, A4, B4 and A3 cassettes, respectively.

Figure 5:
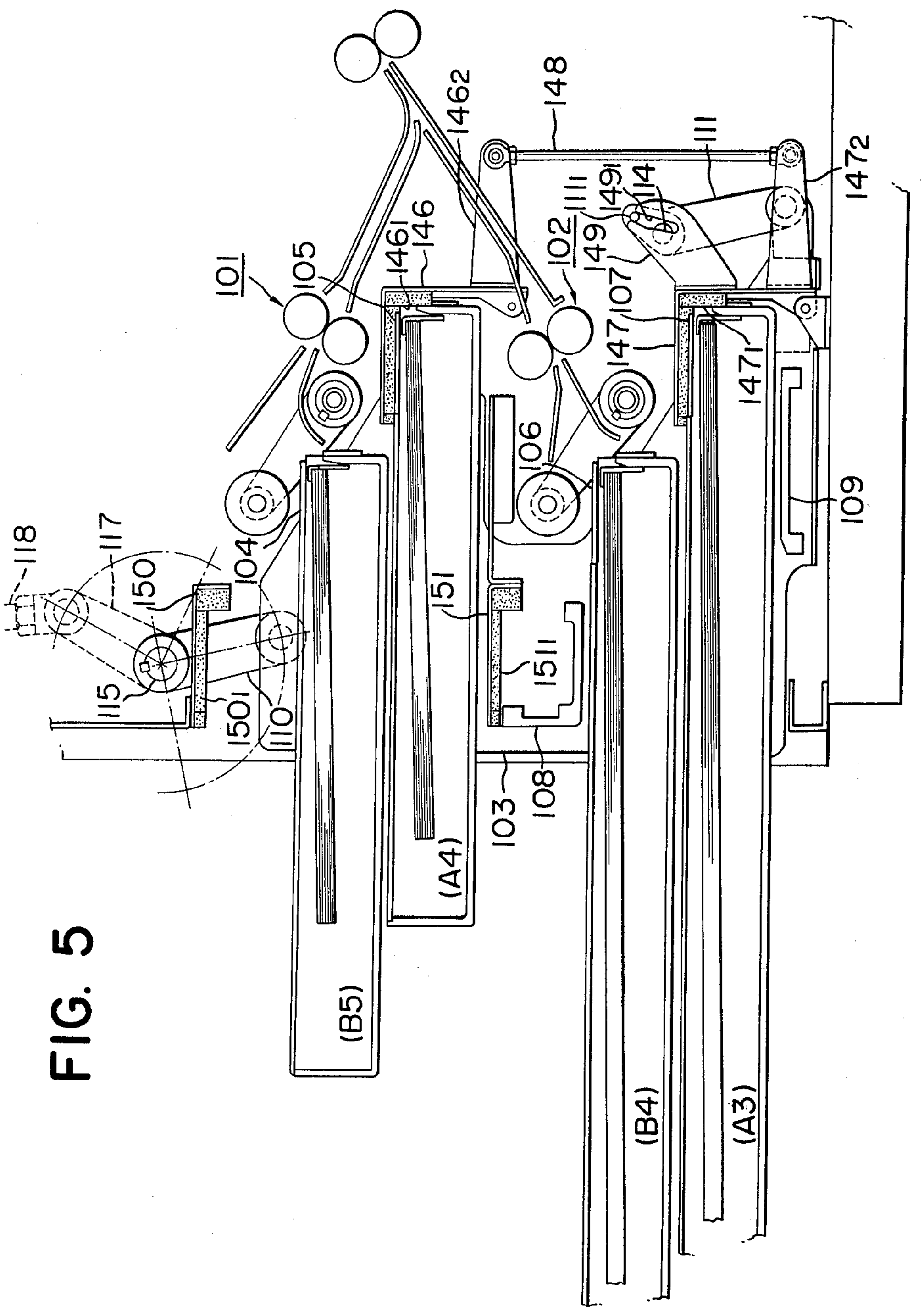
FIGS. 5 and 6 are fragmentary cross-sectional views showing the cassette loading section of the feed device.
Figure 6:
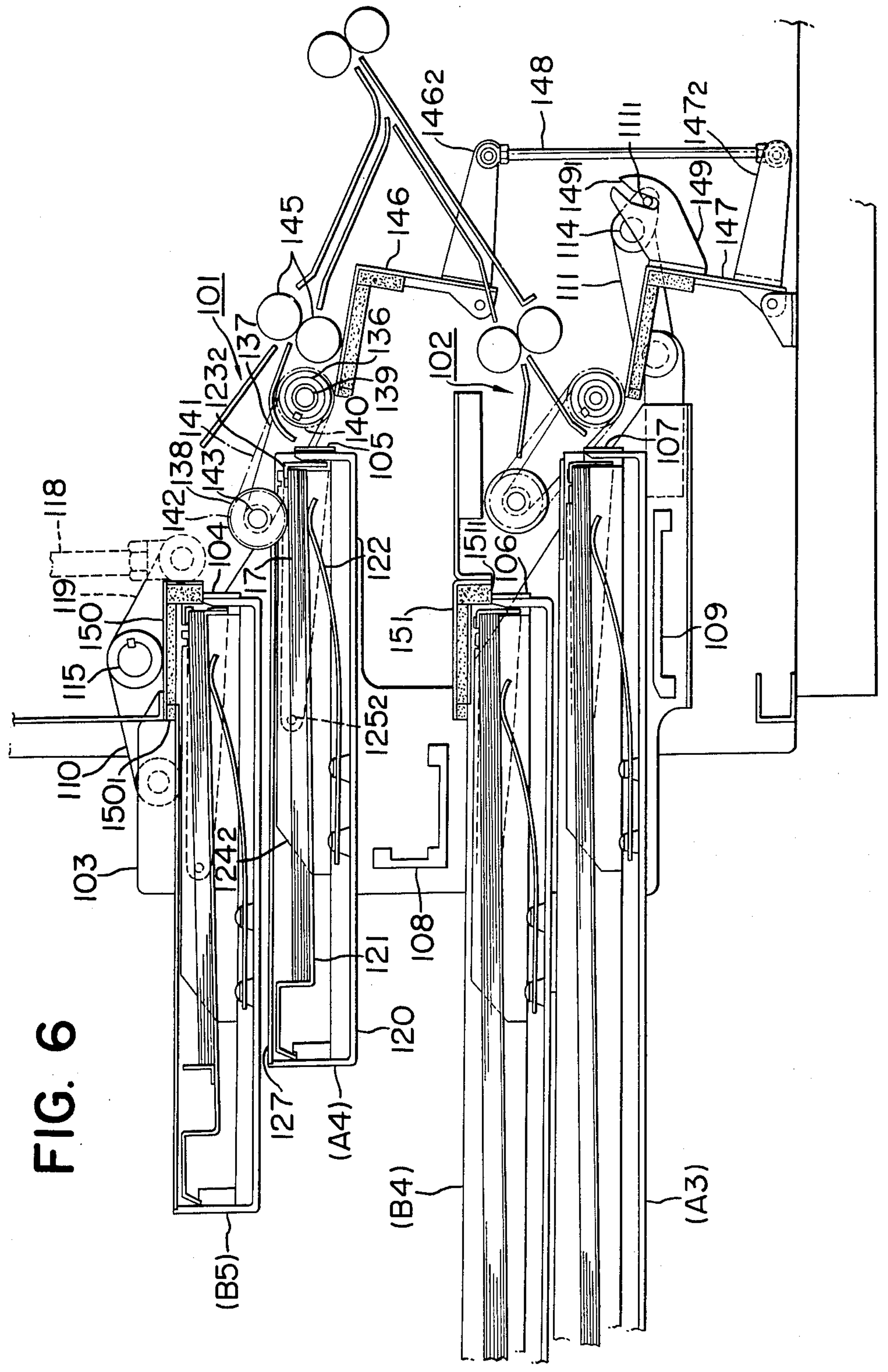
Figure 7:
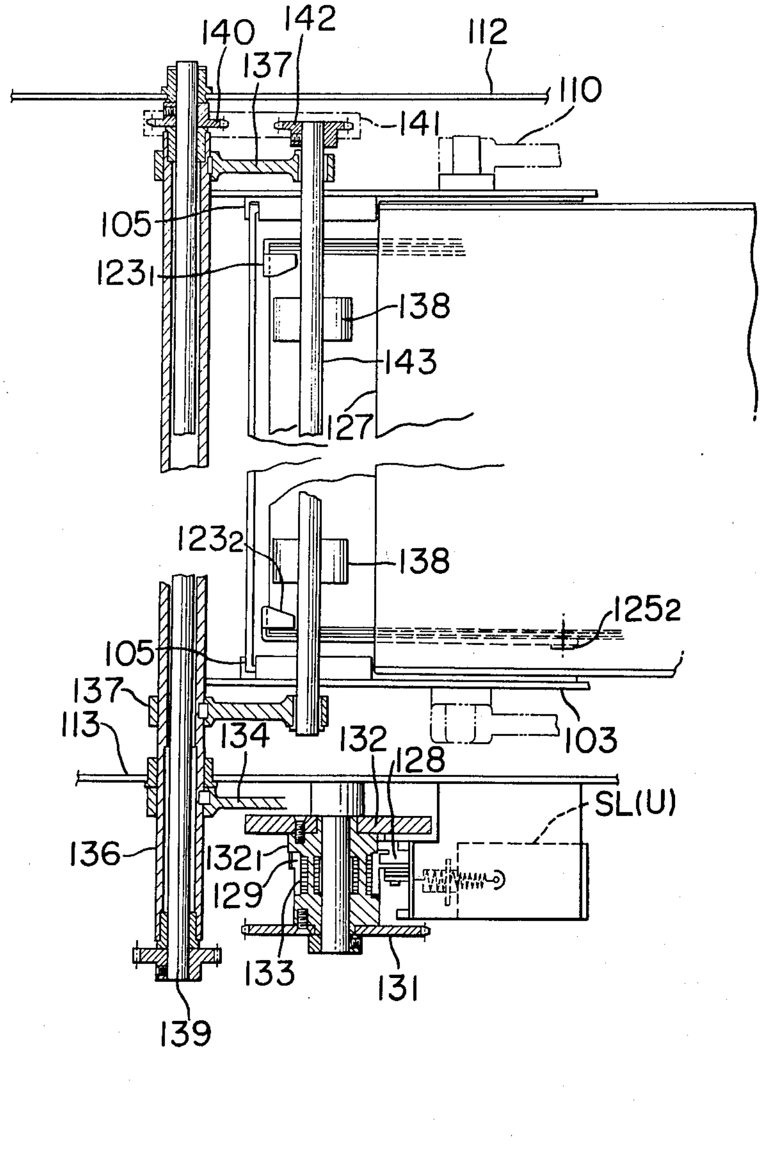
FIG. 7 is an enlarged fragmentary view of the driving section of the feed device.
Figure 8:
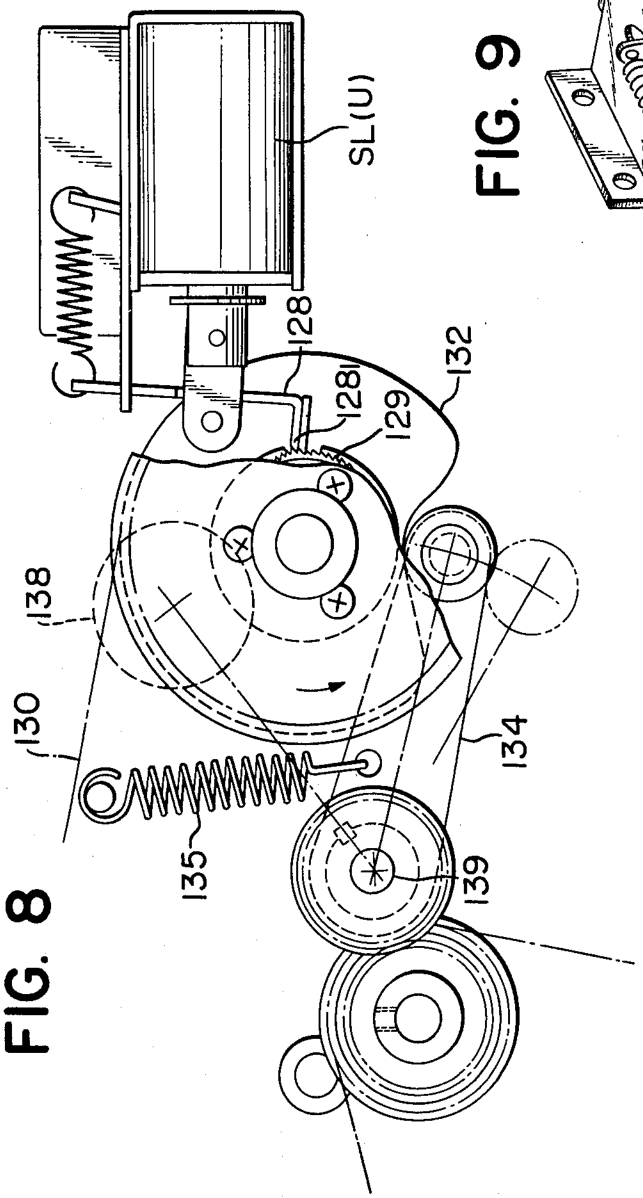
FIG. 8 is an enlarged view of the conventional cam device for feeding.
Figure 9:
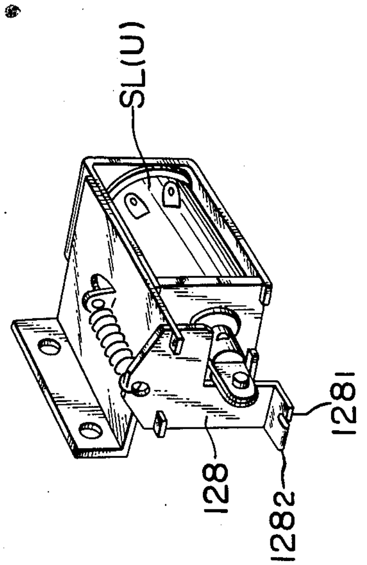
FIG. 9 is a perspective view of a solenoid.
Figure 10:
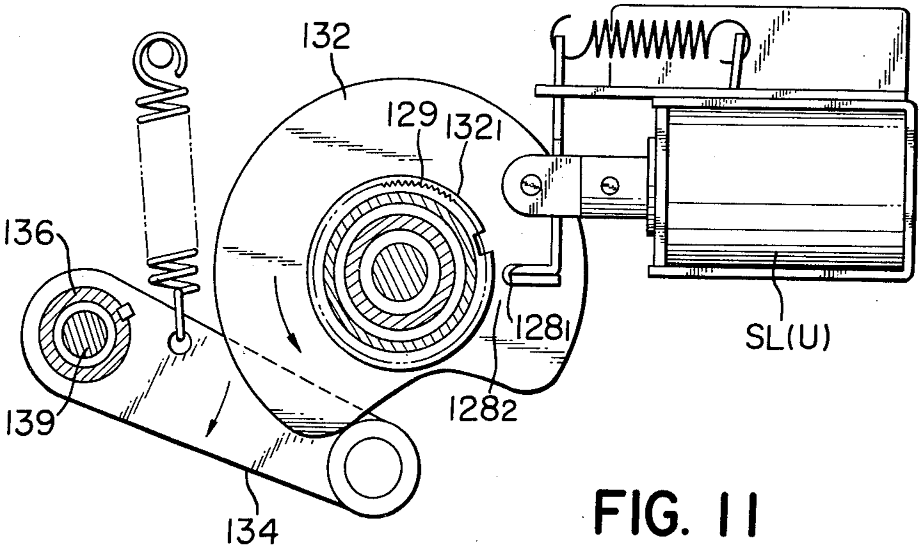
FIG. 10 is an enlarged fragmentary view of the cam device.
Figure 11:
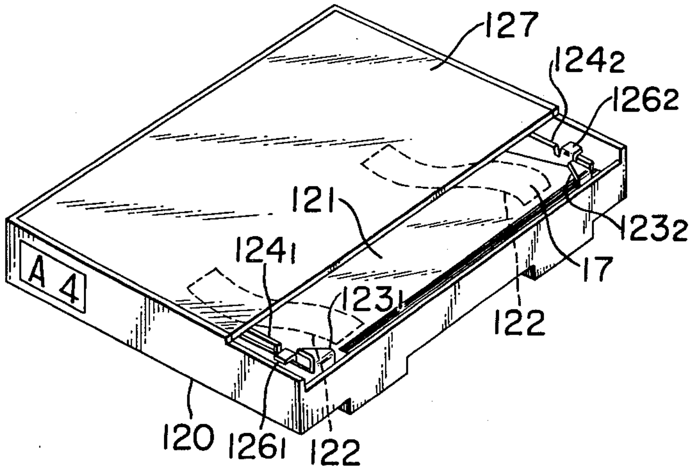
FIG. 11 is a perspective view of a cassette.
Figure 12:
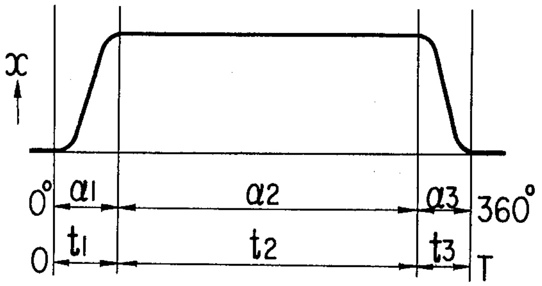
FIG. 12 is a graph illustrating the relation between the conventional cam and cam follower.

The cassettes are substantially horizontally supported on cassette receivers 104, 105, 106 and 107 secured to a cassette cradle 103, respectively. The cassette cradle 103 is rigidly formed by stays 108, 109 and other members, and mounted for displacement relative to the machine body by means of two pairs of pivotable links 110 and 111. The link 111 is a follower link pivotable about a cantilevered pivot shaft 114 secured to the frames 112 and 113 of the machine body. The link 110 is rigidly coupled to a displaceable shaft 115. This shaft 115 extends through said two frames and is journalled thereto by means of bearings 116. Disposed above the shaft 115 is a change-over (displacement) motor M, the drive of which is transmitted through a reduction gear G to rotate a rotatable arm 117 and further transmitted through a connecting link 118 to swing a swingable arm 119, which in turn moves the aforementioned shaft 115. On the head of the rotatable arm 117, there is a cam $117_1$ which actuates switches MS1 and MS2 for detecting and controlling the movement of the arm. In the position shown in FIGS. 3, 4 and 5, the rotatable arm 117 is at rest while actuating the switch MS1 and the connecting link 118 is lifted, with the cassettes brought to their lowered position as shown in FIG. 5. FIG. 6 shows their changed-over position. This is a position in which the rotatable arm 117 has made one-half of one complete rotation to actuate the switch MS2 and the connecting link 118 has been depressed to rotate the link 110 clockwise (FIG. 6) so that the cassette cradle 103 is lifted upwardly (FIG. 6) while holding all the cassettes therein.

In this manner, for the upper feeding section 101, the position so far occupied by the B5 cassette is now occupied by the A4 cassette while, for the lower feeding section 102, the position so far occupied by the B4 cassette is now occupied by the A3 cassette.

Description will now be made of the copy medium feeding operation.

The A4 cassette of FIG. 6 which is in its feeding operation will be explained by reference to FIGS. 4, 7, 8, 9, 10 and 11.

Within a cassette housing 120, there is an intermediate plate 121 serving as a support plate for copy medium, and a plate spring 122 is provided between the intermediate plate and the bottom of the cassette housing so as to upwardly bias the intermediate plate from the back side thereof. A stock of copy mediums 17 is placed on the intermediate plate and separator pawls $123_1$ and $123_2$ are provided to correspond to the forward end corners of the copy medium. The separator pawls $123_1$ and $123_2$ are pivotally connected to opposite side regulating plates $124_1$ and $124_2$ by means of pivots $125_1$ and $125_2$, respectively ($125_1$ being not shown), so that the pawled portion of these pawls are free to move up and down but the upward movements thereof are limited by stops $126_1$ and $126_2$ provided at the upper ends of the side regulating plates. When no feeding operation is taking place, the force of the plate spring 122 is limited through the intermediate plate $121_1$, copy medium $17_1$, separator pawls $123_1$, $123_2$ and ultimately by the stops 126, whereby the position (level) of the copy medium in such condition is determined. The upper side of the cassette is covered with a lid 127 except for the portion thereof which permits the action of feed means (kick-out roller or the like), so as to prevent exposure to the atmosphere. The upper feeding section is provided with a sprocket wheel 131 normally driven by a chain 130, a cam 132, and a clutch comprising a clutch spring 133 wound on the boss portions of both the sprocket wheel and the cam and a control ring 129 to which one end of the clutch spring is secured.

By the control ring 129 being liberated, the spring clutch is connected to transmit the drive of the sprocket wheel 131 to the cam 132. A cam follower 134 is urged against the outer periphery of the cam by a spring 135 and swingable with the rotation of the cam 132. Such movement is transmitted through a pipe 136 to swing a kick-out arm 137 to move a kick-out roller 138 up and down. The drive to the kick-out roller is transmitted by way of a shaft 139 extending within the pipe 136, a sprocket wheel 140, a chain 141, a sprocket wheel 142 and a kick-out roller shaft 143, so that the kick-out roller is normally rotated.

Upon arrival of a kick-out signal, a solenoid SL(U) disengages the pawled tip end $128_1$ of the control pawl 128 from one of fine pawls on the outer periphery of the control ring 129 to connect the spring clutch, thereby rotating the cam 132 and lowering the kick-out roller 138, whereupon this roller depresses the copy medium stock in the cassette by some amount (to the order of 1 to 5 mm) against the force of the plate spring 122, as shown in FIG. 6. At this point, the separator pawls $123_1$ and $123_2$ downwardly follow the lowering of the upper surface of the copy medium stock from their gravity, whereby these pawls hold down the copy medium stock at the forward end corners thereof by their gravity, namely, by a predetermined force, irrespective of the quantity of the copy medium.

The spring constant of the plate spring 122 is predetermined by taking into account the thickness and weight of the copy medium, so that when in depressed position, the constant pressure between the kick-out roller 138 and the copy medium stock 17 varies little irrespective of the quantity of the copy medium. Thus it is ensured that copy mediums are separated and fed one by one.

At a point of time whereat a copy medium is fed from the cassette to the next transport rollers 145 and the cam has made a little less than one complete rotation, the signal to the solenoid SL(U) is discontinued so that the control pawl 128 tries again to restrain the control ring 129. However, the guide portion $128_2$ of the control pawl (FIG. 9) strikes against the boss portion $132_1$ of the cam 132 to prevent the pawl $128_1$ from reaching the control ring 129, so that the cam continues to rotate with the clutch remaining connected. A groove $132_2$ is formed in the boss portion $132_1$ of the cam 132 at such a location that the guide portion $128_2$ of the control pawl drops into the groove $132_2$ at a point of time whereat one complete rotation has been effected and the cam follower 134 has reached the bottom of a valley in the cam 132. Thereupon, the pawled portion $128_1$ of the control pawl restrains the control ring 129 to disconnect the clutch so that the cam stops at the original position whereat its one complete rotation has started, thus enabling another similar cycle to take place for a subsequent feed signal.

The copy medium already fed is transported by the next guide and transport rollers to reach timing rollers 144 (FIG. 2), by which the copy medium is accurately timed with the image on the drum and fed on. The timing rollers are provided with a coaxial clutch C1 (FIG. 4) for controlling the operation thereof.

Two embodiments of the present invention as applied to the feeding section of the above-described copying machine will hereinafter be explained.

A first embodiment is shown in FIGS. 13 to 17 wherein the operation heretofore accomplished by one complete rotation of the cam is to be completed by one-half of one complete rotation without the angular velocity of the cam being changed.

Figure 13:
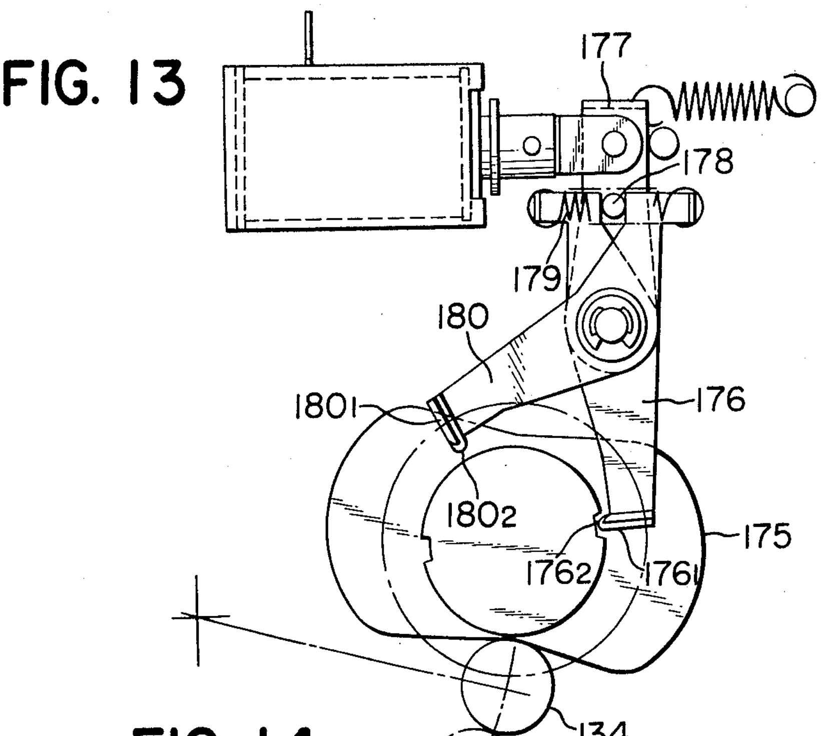
FIGS. 13 to 16 are enlarged views showing the cam control device according to the present invention.
Figure 14:
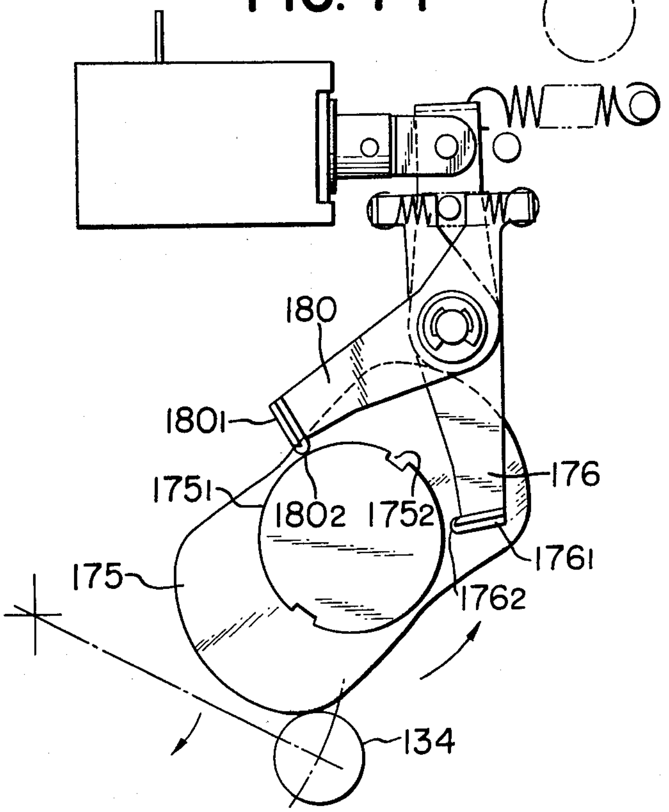
Figure 15:
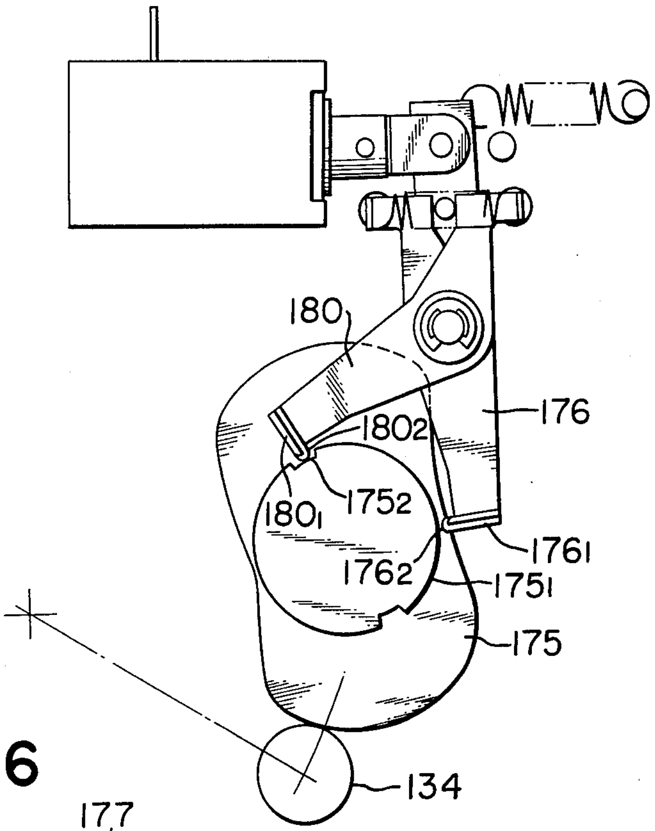
Figure 16:
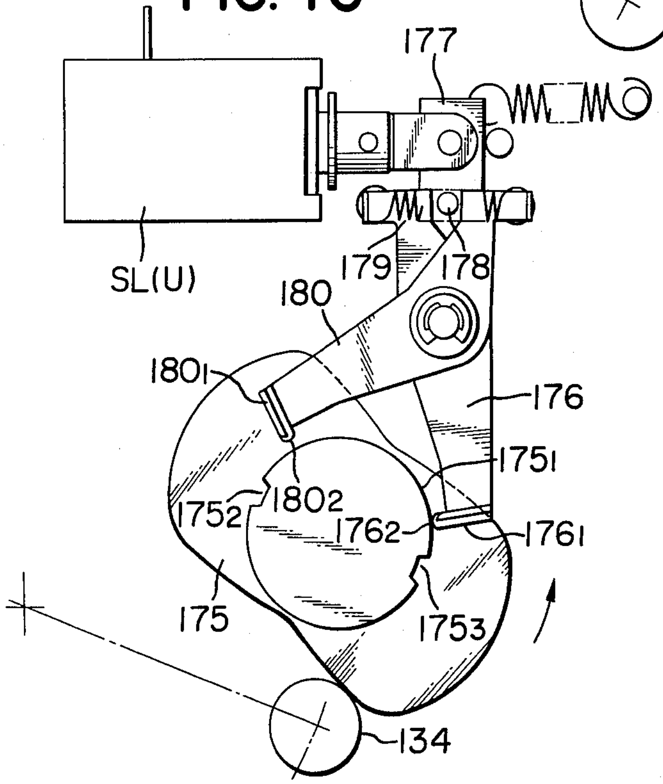

A clutch is interposed between the sprocket wheel 131 (not shown) and an oblong cam 175 and the control ring 129 therefor (not shown) is used to operate the cam in the same manner as already described. Usually, in the position as shown in FIG. 13 wherein the cam follower 134 lies in a valley portion of the cam 175, the pawled end $176_1$ (similar to $128_1$ in FIG. 9) of the control pawl 176 bears against a fine pawl formed on the outer periphery of the control ring 129 to arrest the ring. When a kick-out signal enters, the solenoid SL(U) pulls on a control plate 177 and a pin 178 thereon actuates the control pawl 176 to liberate the control ring 129, whereby the clutch is connected to start rotation of the cam 175. At the same time, a tension is produced in a spring 179 having the opposite ends thereof connected to the control pawl 176 and a stop pawl 180 (the spring 179 normally has a tension acting to hold the pin 178 between the control pawl 176 and the stop pawl 180), and such produced tension rotates the stop pawl 180 counter-clockwise as viewed in FIG. 13, but the guide portion $180_2$ (similar to $128_2$ in FIG. 9) at the end of the stop pawl strikes against the boss portion $175_1$ of the cam 175 and slides thereon to permit the cam 175 to continue its rotation, thus displacing the cam follower 134. When the displacement is completed and the retention zone is entered (FIG. 15), the guide portion $180_2$ of the stop pawl drops in a groove $175_2$ formed in the boss portion $175_1$ of the cam 175, whereby the pawled portion $180_1$ of the stop pawl holds down the control ring 129 to thereby disengage the clutch and stop the cam 175. Such condition is maintained until a predetermined time has passed, whereafter the power supply to the solenoid is discontinued to restore its original condition, whereupon the pin 178 on the control plate 177 rotates the stop pawl 180 counter-clockwise to liberate the control ring 129, so that the cam resumes its rotation and a displacement (return) zone is entered. Simultaneously therewith, the control pawl 176 is rotated clockwise by the action of the spring 179 to cause its guide portion $176_2$ to strike against the boss portion $175_1$ of the cam, whereas the cam 175 still continues to rotate (FIG. 16). At a point whereat the cam 175 has made a first half of one complete rotation with the cam follower 134 having arrived at the bottom of the opposite valley in the cam 175 from that valley previously mentioned, the guide portion $176_2$ of the control pawl 176 drops in the opposite groove $175_3$ from the groove $175_2$ on the boss portion $175_1$ of the cam, in the same manner as described in connection with the stop pawl 180, thereby disconnecting the clutch and stopping the cam. This completes one cycle and the other half of one complete rotation may be utilized to effect just the same operation for another cycle.

Figure 17:
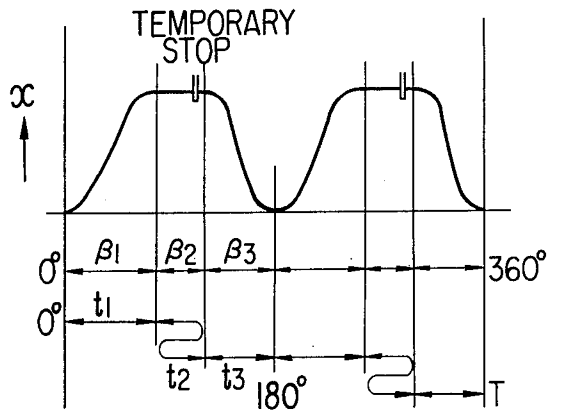
FIGS. 17 and 19 are graphs illustrating the operational relation between the cam and cam follower according to the present invention.

FIG. 17 illustrates the relation between the angle of rotation $\beta$ of the cam and the time t and the displacement $\chi$ of the cam follower in the present embodiment.

According to this system, it is satisfactory if the angles $\beta_1$ and $\beta_2$ can be contained within one-half rotation, and the necessary retention time $t_2$ is determined by the signal irrespective of the cam configuration. Thus, the configuration and angular velocity of the cam may be set up within wide ranges as desired, which means a great advantage in the mechanical construction. Also, the angle of the ramp of the cam in the displacement zone may be gentle to reduce the aforementioned unnecessary force, which in turn leads to excellent structural durability. In addition, the availability of almost all the outer periphery of the cam for displacement means effective use of the camming surface. Further, since the cam is stationary during the retention time $t_2$, the moving distance of the cam follower during one cycle is small and this may reduce the abrasion thereof. Moreover, in the present embodiment, the same cam is used only once for two cycles and this increases the durability of the cam configuration. In this embodiment, one-half of one complete rotation provides one cycle, whereas one-third, one-fourth and so forth of one complete rotation for one cycle may each be likewise effective.

Figure 18:
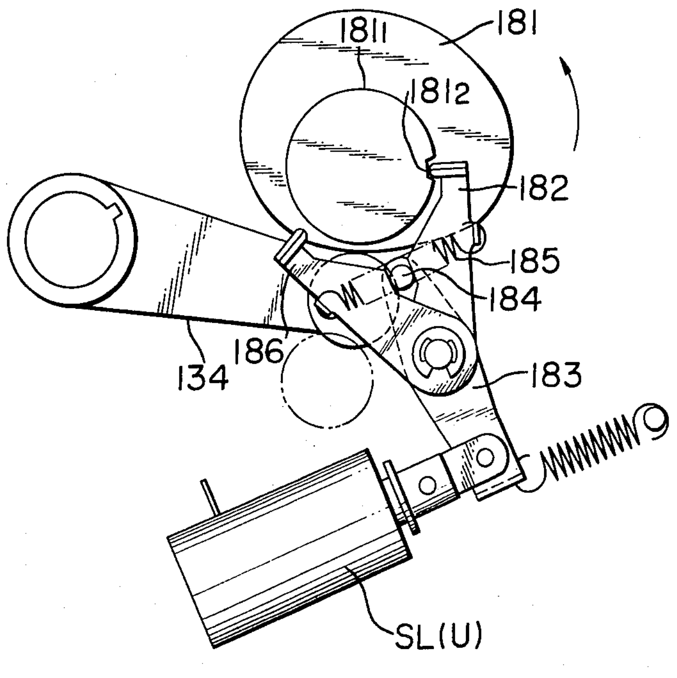
FIGS. 18 and 20 are enlarged views of the cam control device according to another embodiment of the present invention.

A second embodiment is similar to the first embodiment with the exceptions that one complete rotation of the cam provides one cycle and the angular velocity and displacement angle are both increased. Operation of the second embodiment is similar to that of the first embodiment and details thereof need not be described. In FIG. 18, there is seen a cam 181 (175) having a boss portion $181_1$ ($175_1$) and a groove $181_2$ ($175_2$), a control pawl 182 (176), a control plate 183 (177), a pin 184 (178), a spring 185 (179) and a stop pawl 186 (180), the parenthetical numerals designating the corresponding members in the first embodiment.

Figure 19:
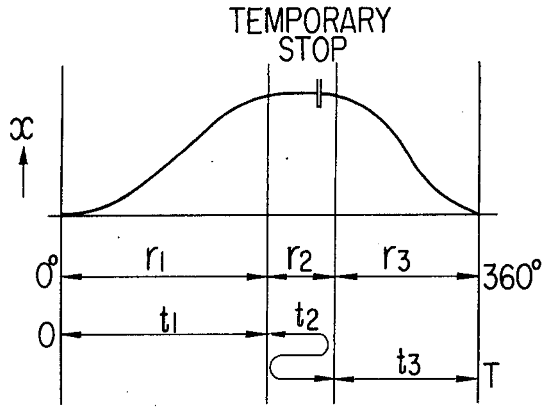

FIG. 19 illustrates the relation between the angle of rotation $\gamma$ of the cam and the time t and the displacement $\chi$ of the cam follower in the second embodiment.

This embodiment again has advantages similar to those of the first embodiment and further, this system only requires the displacement to be completed in one complete rotation of the cam and this leads to the possibility of increasing the angular velocity of the cam. This in turn reduces the torque exerted on the clutch, which also permits the clutch to be of smaller capacity and thus, compactness of the device. In addition, the reduction gear ratio from the drive source such as motor or the like need not be increased and this is useful for the simplification of the construction. Furthermore, the ramp surface of the cam becomes gentler so as to exert no unnecessary force.

Figure 20:
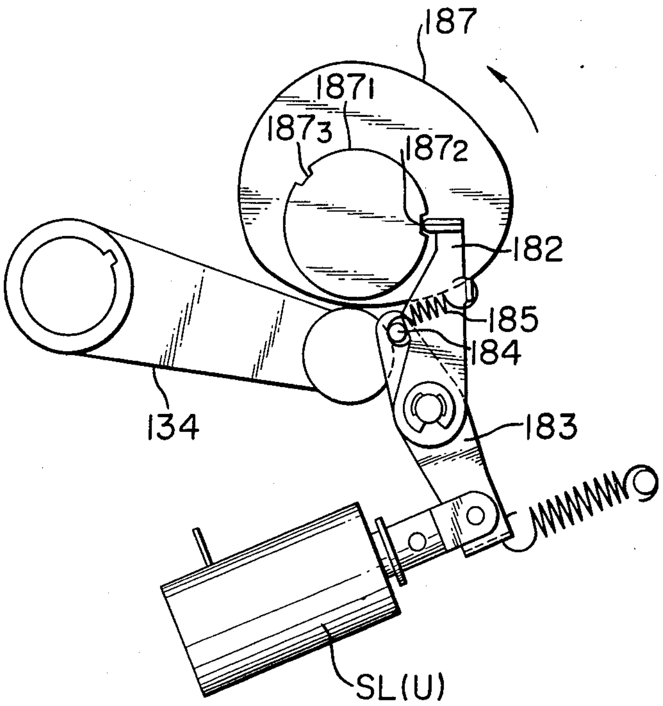

In the two embodiments so far described, the solenoid SL(U) is operated by a signal of the type which can continue from the start of cam rotation till the termination of the retention time, whereas the present invention is not restricted thereto. FIG. 20 shows a third embodiment in which the solenoid is operated by a pulse signal.

This is a modification of the second embodiment in which the control pawl serves also as the stop pawl. When the solenoid SL(U) momentarily pulls on by a start signal, the pin 184 on the control plate 183 causes the control pawl 182 to liberate the control ring 129 (not shown) and connect the clutch, thus starting rotation of the cam 187. The solenoid SL(U) immediately restores its original position and the control pawl is also rotated counter-clockwise, but the guide portion $182_2$ thereof strikes against the boss portion $187_1$ of the cam so that the clutch cannot be controlled. When the cam 187 reaches the retention zone, the control pawl guide portion $182_2$ drops in a groove $187_3$ formed in the boss portion $187_1$, thereby disconnecting the clutch and stopping the cam. After a predetermined retention time has passed, the solenoid SL(U) again pulls on in a pulse-like fashion, whereby the cam 187 resumes and continues its rotation until it restores its original position with the control pawl dropping into the groove $187_2$ of the guide portion $182_2$, whereupon the cam stops.

Figure 21:
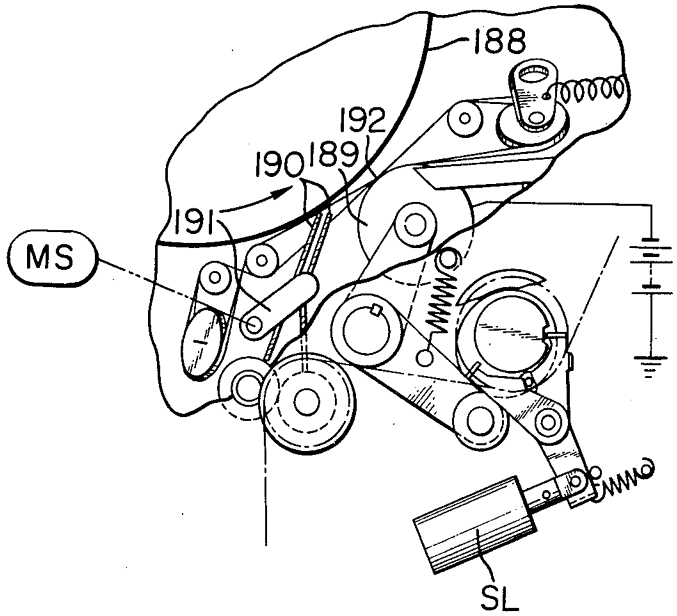
FIGS. 21 and 22 are enlarged views of the essential portions of the present invention as applied for the operation of an image transfer roller.
Figure 22:
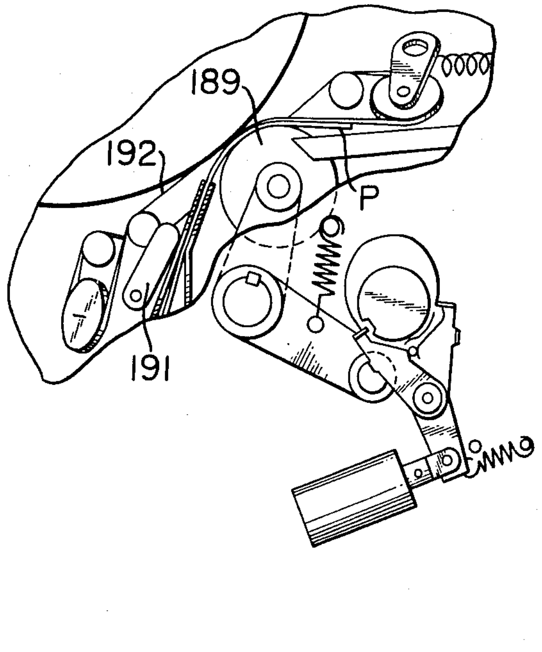

A great feature of the cam device according to the present invention is that the retention time can be set up as desired, depending on how the signal is put out, irrespective of the cam configuration. An embodiment which avails of such advantage and applies it in the operation of the image transfer roller in a copying machine is illustrated in FIGS. 21 and 22.

In this copying machine, a copy medium is brought into contact with the toner image on a drum 188 and a pressure is imparted to the copy medium from the back side thereof by a transfer roller 189 to accomplish image transfer. The transfer roller 189 must be urged against the drum 188 when a copy medium is in the image transfer section, but it should desirably be kept away from the drum during the other time. The reason is that if the transfer roller were urged against the drum 188 when no copy medium was present there, the toner on the drum surface would be transferred to the surface of the transfer roller 189 and would stain the back side of a copy medium as it arrives there.

For this reason, the present embodiment utilizes the camming mechanism of the second embodiment described above. To provide a pressure contact with the drum in synchronism with a copy medium, a detecting arm 191 is provided in a guide 190 for copy medium prior to image transfer and this arm is used to actuate a switch MS.

Now, when a copy medium P comes up through the guide 190 to actuate the detecting arm by the leading end edge thereof, the switch MS is closed to energize the solenoid SL which in turn operates the camming mechanism so that the transfer roller 189 is urged toward the drum 188. The cam configuration and angular velocity and the position of the detecting arm are set such that the pressure contact of the transfer roller 189 is completed substantially in coincidence with the arrival of the copy medium P leading end edge at the image transfer section so as to bring about the retaining position. In the retaining position, the cam is temporally stopped. Also, at the position of the detecting arm 191, as long as the copy medium is present there, the detecting arm continues to be actuated by the copy medium so that the switch MS remains closed and the solenoid SL continues to pull on. When the trailing end edge of the copy medium P has passed by the position of the detecting arm, this arm 191 restores its initial position to open the switch MS and return the solenoid to its initial position, whereby the cam resumes its rotation and the transfer roller 189 is brought out of contact with the drum 188. The cam configuration is selected such that even after the cam has restarted, the cam remains in its retaining position until the leading end edge of the copy medium P has passed by the image transfer position. The above-described operation takes place in synchronism with the movement of the copy medium irrespective of the length thereof.

Further, in the present embodiment, a separator belt 192 is used to separate the copy medium from the drum and the transfer roller 189 serves also as the separator roller. Thus, as will be seen in FIG. 21, whenever the transfer roller 189 is inoperative or out of engagement with the drum 188, the separator belt 192 is also out of engagement with the drum 188 and this contributes to increased life of the belt and enhanced convenience in maintenance services.

In the past, the transfer roller had to be moved in accordance with various lengths of copy medium and this prevented the conventional camming mechanism having a predetermined retention time from being installed and used at such a location. The cam device of the present invention permits the retention time to be freely chosen and can thus be utilized at such a location. Also, as in the present embodiment wherein the point of time for detection and the point of time for starting of the operation are not coincident, a similar effect may be obtained without a timer device being used in particular.

The other portions of the copying machine to which such feature of the present invention is advantageously applicable include various portions such as the fixing roller section (for example, a pair of fixing rollers are brought into pressure contact only when a copy medium is present there), the cleaner section (for example, the cleaning member is urged against the drum only when cleaning is necessary), etc.

Thus, the present invention stops the cam temporally in its retaining position and thereby overcomes the problems peculiar to the conventional camming mechanism, and this will find a much wider range of application and greater usefulness.

We claim:

1. A control device for an intermittently movable driver member, wherein a follower member is disposed adjacent the driver member and is adapted to follow a driving surface of said driver member for displacement, retention and return displacement, said control device comprising:

a control member for controlling the starting and stopping of movement of said driver member, said control member having two control pawls engageable with said driver member;

clutch means for engaging said driver member with a driving source; and means for supplying first and second signals to said control member for starting the movement of said driver member by operating said clutch means to engage said driver member with said driving source, wherein movement of said driver member is started by said first signal to displace said follower member to its said retaining position, whereas movement of said driver member is automatically stopped by said clutch means which is actuated by said control member, and wherein movement of said driver member is restarted by said second signal to provide said return displacement of said follower member, at the completion of which said driver member is automatically stopped by said clutch means which is operated by said control member.

* * * * *